CORE MEMORY

Filed May 25, 1961

INVENTORS.
GLEN R. HEIDLER
STANLEY SCHNEIDER
BY
William R. Nolte
AGENT

CORE MEMORY

Filed May 25, 1961

4 Sheets-Sheet 3

INVENTORS.
GLEN R. HEIDLER
STANLEY SCHNEIDER

BY William R. Nolte
AGENT

Oct. 26, 1965 G. R. HEIDLER ETAL 3,214,743

CORE MEMORY

Filed May 25, 1961 4 Sheets-Sheet 2

INVENTORS.
GLEN R. HEIDLER
STANLEY SCHNEIDER

BY William R. Nolte
AGENT

Oct. 26, 1965 G. R. HEIDLER ETAL 3,214,743

CORE MEMORY

Filed May 25, 1961 4 Sheets-Sheet 1

INVENTORS.
GLEN R. HEIDLER
STANLEY SCHNEIDER

BY William R. Nolte
AGENT 3,214,743

CORE MEMORY

Glen R. Heidler, Paoli, and Stanley Schneider, Newtown Square, Pa., assignors to Burroughs Corporation, Detroit, Mich., a corporation of Michigan Filed May 25, 1961, Ser. No. 112,564
13 Claims. (Cl. 340—174)

This invention relates to toroidal core assemblies, and more particularly to the provision of novel memory plane construction facilitating the assemblage of magnetic cores and their conductors in predetermined relation.

In the co-pending application of Robert M. Tillman, for "Electromagnetic Transducer," Serial No. 818,298, filed May 17, 1960, filed June 5, 1959, now abandoned in favor of continuation-in-part application Serial No. 30,057, filed May 17, 1960, and assigned to the same assignee as the instant invention, there is disclosed an arrangement of cores cemented into holes in a flat phenolic card. The cores are disposed in rows and columns. READ wire windings are wound transversely around all of the cores rowwise and SENSE windings are threaded through successive columns of cores. In such construction each plane contains the words for that plane with a woven sense line running twice through each bit of each word in the plane.

It is the principal object of the present invention to provide an improved toroidal core assembly incorporating the principles of the above-mentioned Tillman application.

A further object of the invention is to provide a magnetic core module housing a plurality of toroidal cores in a manner to facilitate their assembly and replacement in a memory plane and simultaneously to afford protection for the cores therein.

A still further object of the invention is to provide a core mounting for toroidal cores wherein provision is made for separation between orthogonally disposed windings individual to said cores.

A still further object of the invention is to provide a novel mounting for toroidal cores and electrical components associated therewith.

In accordance with the above objects and first briefly described, the invention comprises a number of core-holding modules assembled in memory planes. Each module includes an elongated part having a row of recesses which receive and support toroidal magnetic cores therein. Windings of solenoid form are wound in a lengthwise direction around the part to encircle all of the cores in the row. A plurality of said modules with their cores arranged in a common plane are assembled upon a common supporting base. A component holder, such as for diodes, also is fastened along a margin of the base in a manner so that the free ends of the solenoid windings may be interconnected with said diodes. The supporting base formed of low reluctance materials and constituting a permanent magnetic bias, is thus positioned to lie in the flux path of said solenoid windings when current is pulsed through the latter. A plurality of such memory planes so assembled together and stacked one upon another to form a memory stack may be enclosed at opposite ends thereof with printed circuit boards. Sense lines are then passed through holes in the latter boards and coaxially through like positioned cores in successive memory planes to complete the wiring of the stack.

For a better understanding of the invention, reference is made to the following description in connection with the accompanying drawings.

Figure 6:
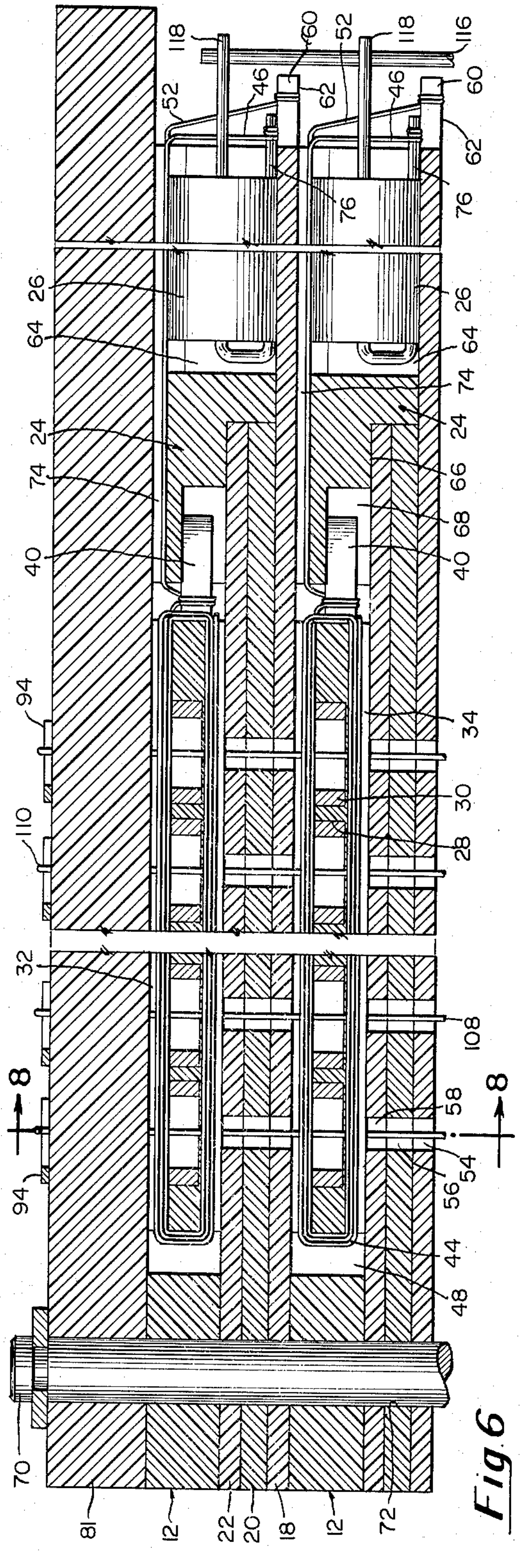
FIG. 6 is an enlarged sectional view taken on the line 6—6 of FIG. 2 with parts broken away and more clearly illustrating the solenoid windings encircling the longitudinal rows of cores contained in each module.
Figure 7:
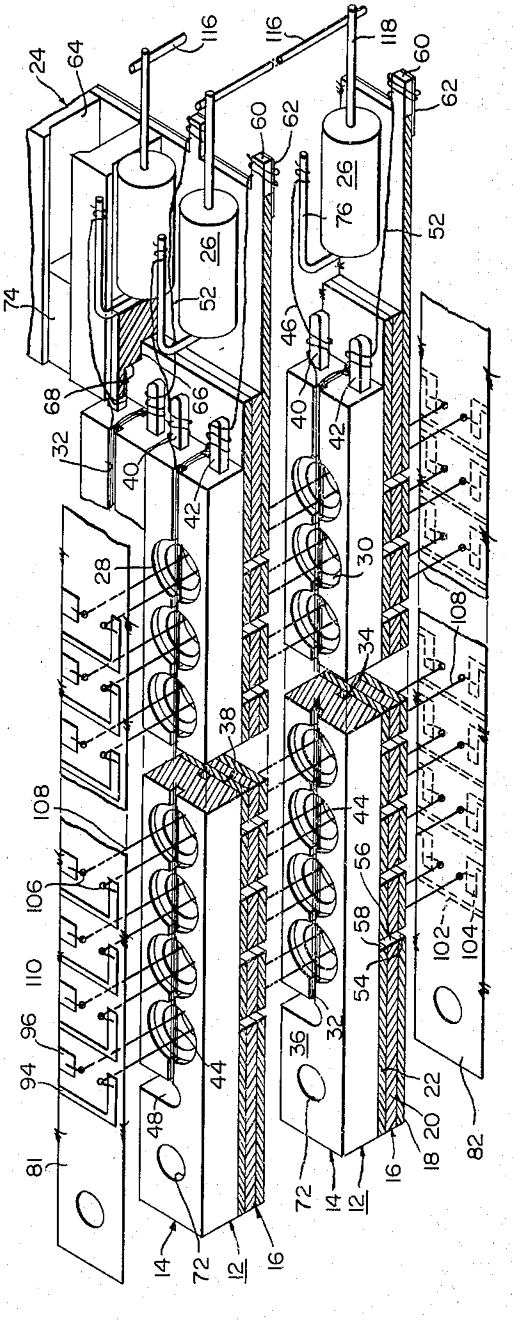
FIG. 7 is a fragmentary exploded view in perspective with parts broken away, and illustrating wiring of the assembly.
Figure 1:
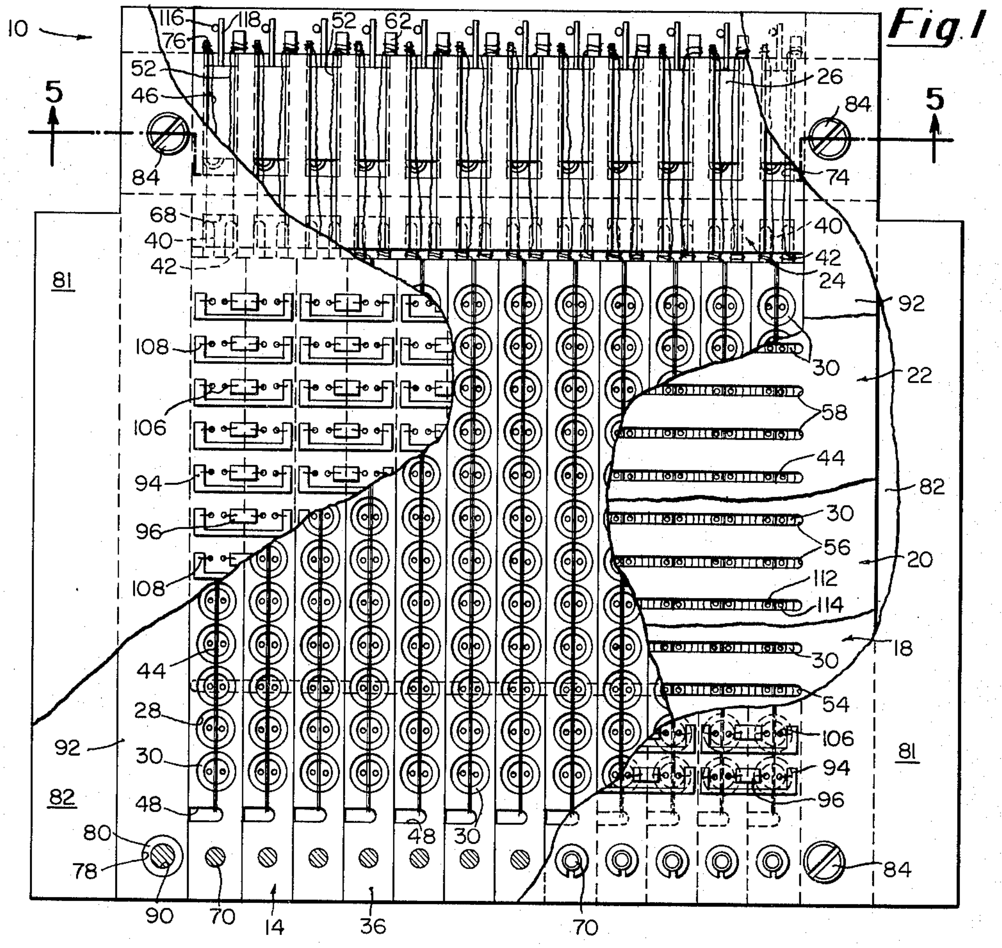
FIG. 1 is a top plan view of a plurality of memory planes stacked one upon another and broken away to more clearly illustrate the manner of assembly of the core modules within the planes.
Figure 2:
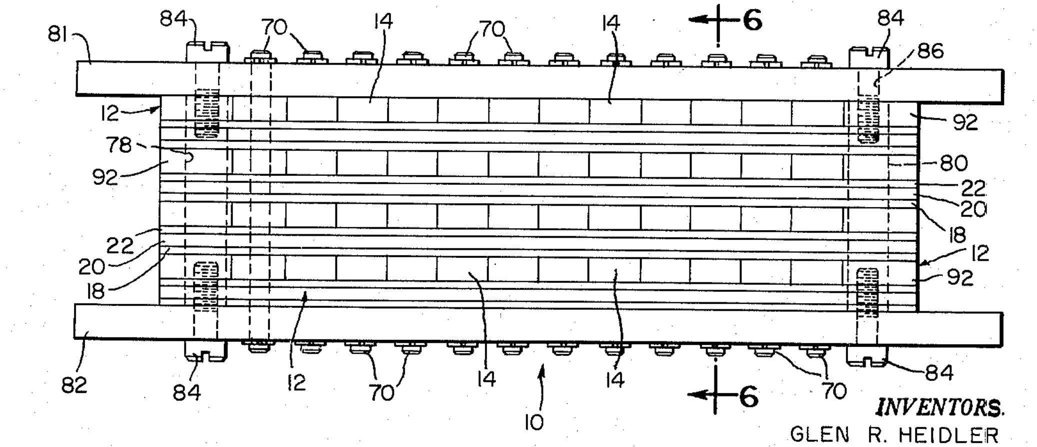
FIG. 2 is an end view of FIG. 1 showing a plurality of memory planes assemblies in vertically stacked formation.

In the illustrated form of the invention and first with reference to FIGS. 1, 2 and 7, the magnetic core plane assembly 10 generally comprises a plurality of stacked memory planes 12, each including a plurality of core modules 14 which constitute the basic building blocks of the core memory planes. In each plane the modules are assembled upon a supporting base 16 which in the present embodiment may include three planar members 18, 20, 22 suitably secured one to another. An electrical component holder 24, FIGS. 6 and 7, such as for receiving diodes 26, is also affixed as by a suitable cement to the first planar member 18 of the base 16 along a margin thereof. The second planar member 20, having low reluctance properties and constituting a permanent magnetic bias, is cemented between the first member 18 and the third planar member 22, the latter two members being preferably formed of non-magnetic material such as plastic.

Figure 4:
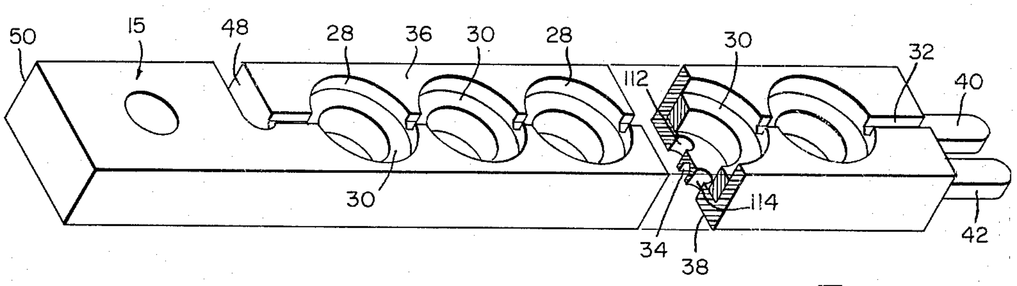
FIG. 4 is a perspective view with portions broken away of an unwired magnetic core module constituting the basic building block of the memory plane of FIG. 1.

With reference now to FIG. 4, it is seen that each of the core modules 14 includes a part 15 of suitable non-magnetic material such as plastic which is of slender or elongated form and includes a row of circular recesses 28 disposed in the top surface thereof. A toroidal magnetic core 30 of a material having a substantially rectangular hysteresis loop is positioned in each of the recesses. Prior to inserting the cores in their respective recesses, the cores may first be dipped in rubber cement or some similar resilient bonding agent, which provides an adhesive to keep each core in its place yet permits it to "breathe" (expand and contract) under the effects of magnetostrictive action when switched between its different states. The depth of each of the recesses 28 is greater than the thickness of the core 30, the reason for which will become evident as this description proceeds. At the median plane of the row containing the cores, grooves 32 and 34 (FIG. 9) are formed in opposite surfaces 36 and 38 of the part 15. Mechanical termination pins 40 and 42 are fastened to one end of the member by molding or other suitable means of securement.

A winding 44 of solenoid form is wound longitudinally around part 15 as seen in FIGS. 6 and 7. First allowing a short length 46 for connection in a manner to later be described, the winding commences by encircling terminal pin 40, is passed forward to extend in groove 32 along front face 36 of the member 14. The winding is then passed through slot 48 which extends inwardly from side 50 and transversely to intersect the median plane containing longitudinal grooves 32 and 34. It is then bent back upon itself to lie in the rear groove 34 in face 38. The winding is then again brought forward to groove 32 in the front face and successive turns of the winding may be applied in the same manner. At the conclusion of a predetermined number of turns the winding is wrapped around and connected to the other terminal pin 42, and a length 52 is similarly reserved for a purpose to be later described. At this point in the fabrication it is apparent that cores in each core module 14, wrapped with solenoid drive winding 44, may be tested electrically prior to insertion within its respective memory plane.

Figure 3:
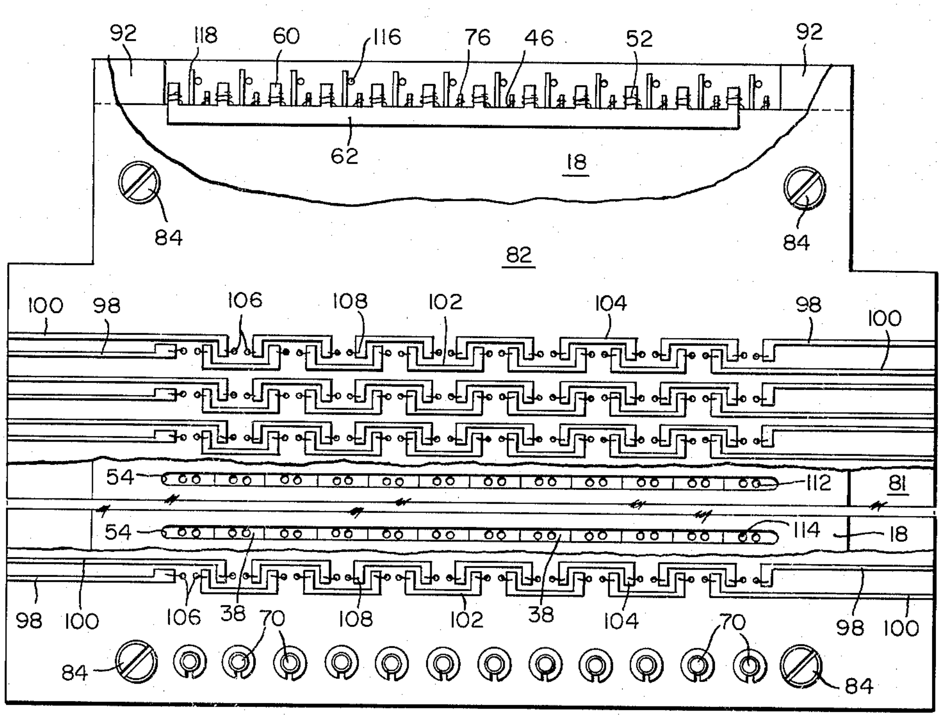
FIG. 3 is a fragmentary view of the bottom of the memory stack illustrating the printed circuit paths on the outer plate thereof, and with parts broken away to show other wiring.
Figure 5:
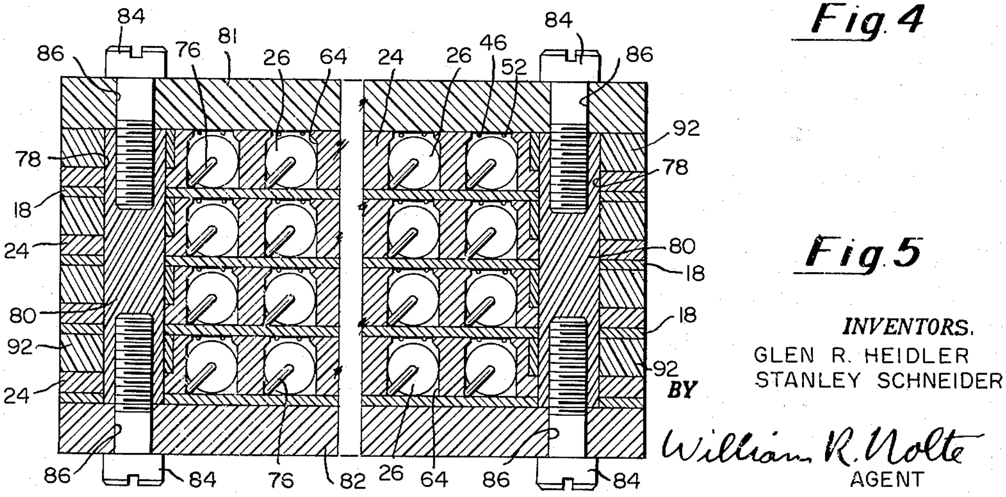
FIG. 5 is an enlarged sectional view taken on the line 5—5 of FIG. 1 with parts thereof broken away and illustrating the component holding modules common to each memory plane.

The previously mentioned plates 18, 20 and 22 of base 16 are each of generally rectangular configuration and each includes a plurality of elongated concentrically arranged slots 54, 56 and 58 respectively, FIG. 1. The slots are disposed transverse to the rows of cores in modules 14 and are aligned with the core centers in each row. As seen in FIGS. 6 and 7, the lowermost plate member 18 is longer than plates 20 and 22 and includes tab-like fingers 60, see FIG. 3, which are all interconnected by a common or bus bar in the form of a printed circuit path 62 adhered to the lower surface of the baseboard 18, and which serves as a core plane drive line. The component or diode holder includes a plurality of recesses 64 corresponding in number to said tab-like fingers 60 for receiving components such as diodes 26 whose axes correspond in direction to the long axes of stick-like core members 15. The holder is notched or cut away as at 66, FIG. 6, to abut and overlap portions of plates 20 and 22. A second cut-away portion or aligning cavity 68 stepped upwardly from notch 66 overlays the electrical terminals 40, 42 of stick-like members 14 when the terminals are inserted into the aligning cavity, while the end of each of the members opposite the terminals may be secured into its location by means of pins 70 passing through holes 72 of the member. When so secured in place the previously mentioned free end or lead 46 extending from terminal 40, may be passed through a slot 74 in the upper surface of holder 24 and secured to lead 76 of diode 26. The other lead 52 extending from electrical terminal 42 is likewise laid in a slot 74, FIG. 6, and secured to its corresponding finger or tab 60 on board 18. The core planes 16 assembled as indicated in FIGS. 6 and 7 may be stacked one upon another, as illustrated in FIGS. 1, 2 and 5, and for this purpose each includes four corner holes 78 through which are passed non-magnetic rods 80. Top and bottom printed circuit boards 81 and 82 sandwich the stack of memory planes therebetween by bolts 84 passed through corner holes 86 of the top and bottom boards, said bolts being received in axial threaded bores 90 at opposite ends of rods 80. Spacer strips 92 of the same thickness as core modules 14 and disposed in the same direction on opposite margins of each core plane prevent deflection of the end portions of the memory planes as bolts 84 are tightened, FIGS. 2 and 5.

The memory of the present invention employs the technique which provides electrically alterable, random-access, non-destructive read of the cores therein. This technique is described in detail in the above-mentioned copending Tillman application and employs the principle of orthogonal magnetic fields to read the standard ferrite memory cores 30 used in the herein-described memory plane configuration. The solenoid winding 44 contained in grooves 32, 34 of the core module 14 produce H fields when suitably pulsed with current. It is observed that the placement of the central base plate 20 formed of a material constituting a static permanent magnet bias in proximity to the solenoid windings 44 produces a rather marked signal enhancement and obtains an appreciable increase in memory stack signal-to-noise ratio.

With reference to FIG. 1 it is seen that the top printed circuit board 81 includes a plurality of circuit pads 94 and 96 disposed transversely with respect to the rows of cores in the members 14 therebeneath. In a similar manner the lowermost plate 82 contains printed circuit pads 98, 100, 102 and 104 likewise disposed transversely with respect to the rows of cores. The aforementioned printed circuit boards include holes 106 through which sense lines 108 are threaded and suitably terminated as by clinching against a surface of each pad as at 110 and by soldering.

Figure 8:
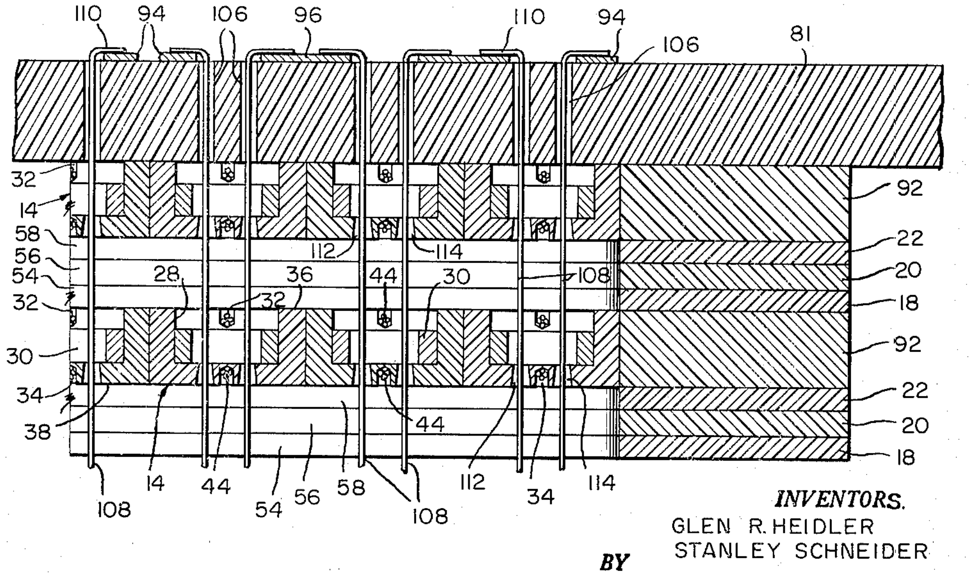
FIG. 8 is an enlarged sectional view taken on the line 8—8 of FIG. 6 with parts broken away and more clearly illustrating the sense wires extending through the cores and straddling the solenoid windings.

Referring now to FIG. 8, each sense wire 108 is passed upwardly through the elongated slots 54, 56, 58 in said base plates 18, 20 and 22 respectively and through tapered holes 112, 114 located on opposite sides of the solenoid windings 44 wrapped around each core stick 14. The holes 112, 114 are moreover spaced apart a distance less than the inner diameter of the toroidal cores 30 so as to preclude sense wires 108 from touching each other, the solenoid drive lines 44, or the core. This construction provides mechanical spacing of the wires, and moreover eliminates the need for insulated wire by permitting standard tinned wire to be used. Wires 116 also extending parallel to sense lines 108 and passing externally of the memory stack, FIGS. 6 and 7, are suitably interconnected to the free end leads 118 of each vertical column of diodes 26.

Figure 9:
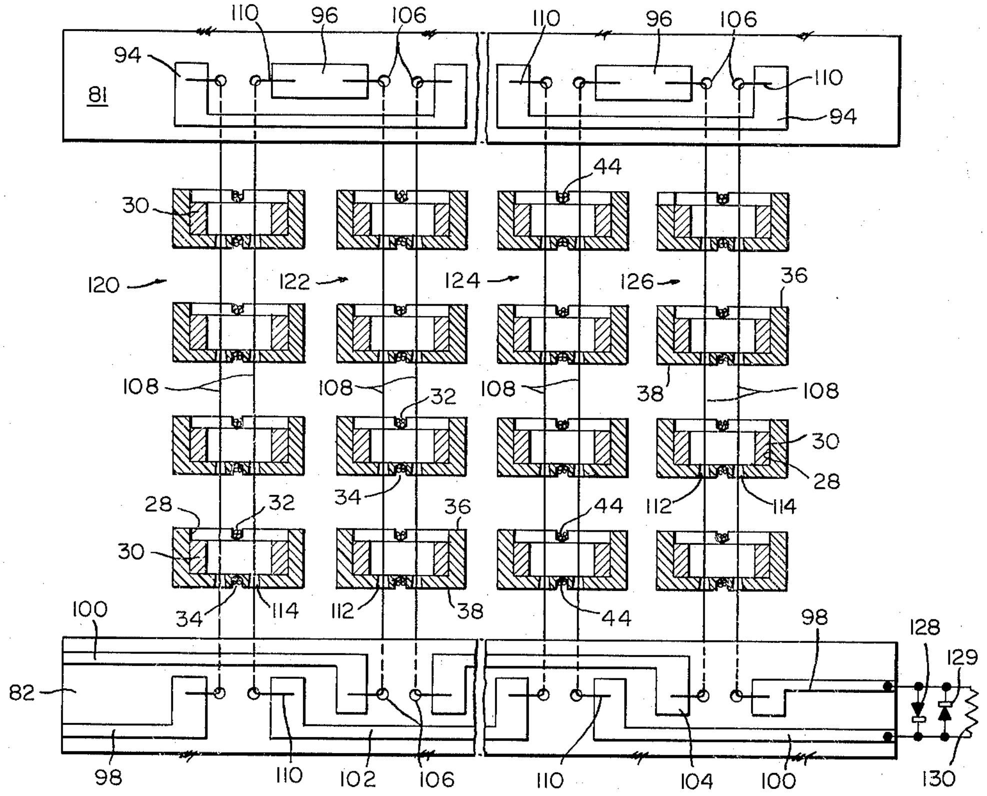
FIG. 9 is a schematic view similar to FIG. 8 but with the outer printed circuit plates each rotated 90 degrees from their normal positions to illustrate the securement of the ends of the sense wires to their respective printed circuit pads on the end plates of the memory stack.

The wiring pattern for the sense winding threaded through the memory cores is illustrated in the schematic representation of FIG. 9 in which the printed circuit end plates are each rotated 90° from their normal position into the plane of the paper. Commencing in the lower lefthand corner of FIG. 9, current entering pad 98 passes up the first column of cores 120 through printed circuit pad 94 and down the second column 122 to printed circuit pad 104. The latter pad skips the illustrated third column 124 and passes the current up through the fourth column 126 to printed circuit pad 96 which routes the current down through the third column 124 to circuit pad 100 which is interconnected with pad 98 by means of diodes 128, 129 and resistor 130 external of the memory stack. The current then passes up through the fourth column 126, down the third column of cores by way of pad 94, then up through the first column 120 by way of pad 102, and finally down the second column 122, through pad 96 and out through pad 100. Upon reversal of the direction of current the same passes through diode 129 instead of 128. The sense windings are thus threaded through each core to produce larger output signals and at the same time provide common mode noise cancellation.

From the foregoing description of the illustrated embodiment of the invention, it is appreciated that a novel memory module has been provided which includes a stick-like part with preformed holes arranged in a row. Ferrite cores mounted in side-by-side relation in the holes are encircled by solenoid windings around the part to pass across opposite faces of each core. The modules are arranged in common planes with sense wires passed coaxially through the cores transversely to the direction of the solenoid windings. Thus only the sense wires need be passed through the apertures of the cores. It is further appreciated that incorporation of the word selection diodes in the basic planes of the memory construction is effective to keep the solenoid return path inductance to a minimum and at the same time to decrease the number of electrical connections for the drive solenoid windings to a minimum.

Having thus shown, described and pointed out the fundamental features of the invention as applied to the presently preferred embodiment of the invention, it will be understood that various changes in the form and details of the device illustrated and its operation may be made by those skilled in the art without departing from the invention. It is the intention, therefore, to be limited only as indicated by the scope of the following claims.

What is claimed is:

1. A magnetic memory module comprising: an elongated stick-like member having an aligned row of recesses in one surface thereof, a toroidal core disposed in each of said recesses with the axes of the cores disposed parallel to each other, and a solenoid winding encircling said stick and passing across opposite outer faces of said cores and transverse to said axes, said stick-like member also being provided with apertures for receiving windings through the bores of said cores and parallel to said axes.

2. A magnetic memory module comprising: an elongated stick-like member having opposite flat surfaces, and an aligned row of recesses in one flat surface thereof, a toroidal core disposed in each of said recesses with the axes of the cores disposed parallel to each other, and with their opposite faces adjacent the said opposite flat surfaces of said stick-like member, and solenoid windings encircling said stick and passing across and closely adjacent the opposite outer faces of said cores and transverse to said axes, said stick-like member also being provided with apertures through the other of said opposite surfaces for receiving windings through the bores of said cores on opposite sides of said solenoid windings and parallel to said axes.

3. A magnetic memory module comprising: an elongated stick-like member having opposite flat surfaces, an aligned row of circular recesses in one flat surface thereof, and shallow grooves in said surfaces disposed transversely through the axes of said circular recesses, a toroidal core disposed in each of said recesses with the axes of the cores disposed parallel to each other, and coaxial with the recess axes, the opposite faces of said cores being adjacent the opposite flat surfaces of said member, and a solenoid winding encircling said stick within said grooves and passing across and closely adjacent the opposite outer faces of said cores and transversely through said axes, said stick-like member also being provided with apertures extending from the bottom of said recesses and through the other of said opposite surfaces of said member for receiving windings through the bores of said cores on opposite sides of said solenoid windings and parallel to said axes.

4. A magnetic memory device comprising: an elongated stick-like member having a plurality of recesses disposed in a row, a plurality of toroidal cores supported within said recesses so that their axes are disposed in a common plane, said member including grooves encircling the same and lying with their major dimensions within said plane, and a winding of solenoid form and including at least one loop received in said grooves and adapted to pass across opposite faces of said toroidal cores, said member further including a pair of apertures located within the periphery of each of said recesses so that one aperture of said pair is disposed upon one side of said plane and the other aperture of said pair is located on the opposite side thereof, for receiving second windings passing through each said core and through said apertures in spaced relation with said solenoid windings and said cores.

5. A magnetic memory device comprising: a plurality of strips assembled together in a plane, each strip having recesses spaced in a row along its length, a magnetic core disposed in each recess, a winding of solenoid form individual to and encircling each strip to pass across the outer faces of the cores contained in each row, planar means for supporting said strips in stacked planes one upon another, with like located cores in adjacent planes coaxially aligned, and second windings passed through said coaxially aligned cores.

6. In a magnetic memory device as set forth in claim 5 wherein said planar means include a first member having low reluctance properties positioned in contacting engagement with each plane of said strips to lie in the flux path of said solenoid winding when current is passed therethrough.

7. In a magnetic memory device as set forth in claim 6 wherein said planar means include a second planar member of non-magnetic material secured to said first planar member and adapted to space adjacent stacked planes of core strips one from another.

8. In a magnetic memory device as set forth in claim 7 wherein said planar means include a third planar member secured to said second member, a component supporting member secured to said third member, said supporting member including recesses for receiving components therein for electrical connection with the free ends of said solenoid windings.

9. In a magnetic memory device comprising: a planar base having low reluctance characteristics and constituting a permanent magnetic bias, a plurality of core modules each including an elongated stick-like member having a plurality of recesses disposed in a row along its length and supported in a plane upon said base, a toroidal core nested in each of said recesses in side-by-side relationship, the cores in adjacent modules lying in a plane parallel to the plane of said base, and a winding of solenoid form encircling each member and passing across opposite faces of each core in said member, said members having apertures to receive sense windings threaded through said cores normal to said solenoid windings.

10. In a magnetic memory device comprising: a planar base having low reluctance characteristics and constituting a permanent magnetic bias, a component holder affixed along a marginal portion of said base and having a plurality of recesses, an electrical component housed within each recess of said holder, a plurality of core modules suported upon said base, each module including an elongated stick-like member having a plurality of recesses disposed in a row along its length, a toroidal core nested in each of said recesses in side-by-side relationship, the cores in adjacent modules lying in a plane parallel to the plaine of said base, and a winding of solenoid form encircling each member and passing across opposite faces of each said core in said member and electrically connected to a component in said holder, said module including means for threading sense windings through said cores normal to said solenoid windings.

11. In a magnetic memory device comprising: a base including first and second sheet members of non-magnetic materials sandwiching therebetween a third member having low reluctance characteristics and constituting a magnetic bias, said second member including a plurality of tab portions along a margin thereof and interconnected by a common circuit path, a component holder affixed to said second member adjacent said common circuit path and having a plurality of recesses therein, an electrical component housed within each recess of said holder, a plurality of core modules each including an elongated stick-like member having a plurality of recesses disposed in a row along its length and supported upon said base, a toroidal core nested in each of said recesses in side-by-side relationship, the cores in adjacent modules lying in a plane parallel to the plane of said base, and a winding of solenoid form encircling each member and passing across opposite faces of each said cores and electrically connected to a component in said holder and to said common circuit path, and means whereby sense windings may be threaded through said cores normal to said solenoid windings.

12. In a magnetic memory device comprising, a plurality of core plane arrays each including a plurality of elongated strips disposed in parallel relation one to another, said strips each including a plurality of recesses disposed in a row therein, a plurality of magnetic cores nested in said recesses and spaced along the length of each strip, the axes of like spaced cores in strips in adjacent planes being co-linear, a pair of electrical terminal elements secured at an end of each strip, a winding of solenoid form individual to and encircling each strip lengthwise to pass across the outer faces of said cores, the free ends of said windings being connected to said terminals, spacer means disposed between said strips contained in said core plane arrays and including a first member having a permanent magnetic bias, a second member secured to said first member, a component module fastened to said second member and adapted to receive said terminal elements of said strips for electrical connection with the components received therein, a pair of plates of insulative material having printed circuit paths disposed thereon sandwiching said arrays of core planes therebetween, and second windings threaded through said co-linear cores and having their ends secured to said printed circuit paths.

13. In a magnetic memory device comprising, a plurality of core plane arrays each including a base having first and second sheet members of non-magnetic materials sandwiching therebetween a third member having low reluctance characteristics and constituting a permanent magnetic bias, said second member including a plurality of tab portions extending along a margin thereof and interconnected by a common circuit path, a holder supported upon said base, a plurality of electrical components received in said holder, a plurality of core modules supported upon said base, each module including an elongated stick-like member having a plurality of recesses disposed in a row along its length, a toroidal core nested in each of said recesses, the cores in adjacent modules lying in a plane parallel to the plane of said base, a winding of solenoid form encircling each member to pass across opposite faces of each core in said member and electrically connected to a component in said holder and said common circuit path, a pair of plates of insulative material having printed circuit paths disposed thereon sandwiching said plurality of core plane arrays therebetween, second windings threaded through said cores and having their ends secured to said printed circuit paths, and conductors interconnecting the electrical components in said core plane arrays.

References Cited by the Examiner

UNITED STATES PATENTS

| | | | |
|---|---|---|---|
| 2,752,537 | 6/56 | Wolfe | 340—174 X |
| 2,781,503 | 2/57 | Saunders | 340—174 |
| 2,823,372 | 2/58 | Jones | 340—174 |
| 2,945,215 | 7/60 | Sprude | 340—174 |
| 2,978,681 | 4/61 | Sims et al. | 340—174 |

IRVING L. SRAGOW, *Primary Examiner.*